May 5, 1959 H. S. MYERS, JR 2,884,937
STANDPIPE PROPELLANT TANK
Filed Nov. 16, 1956
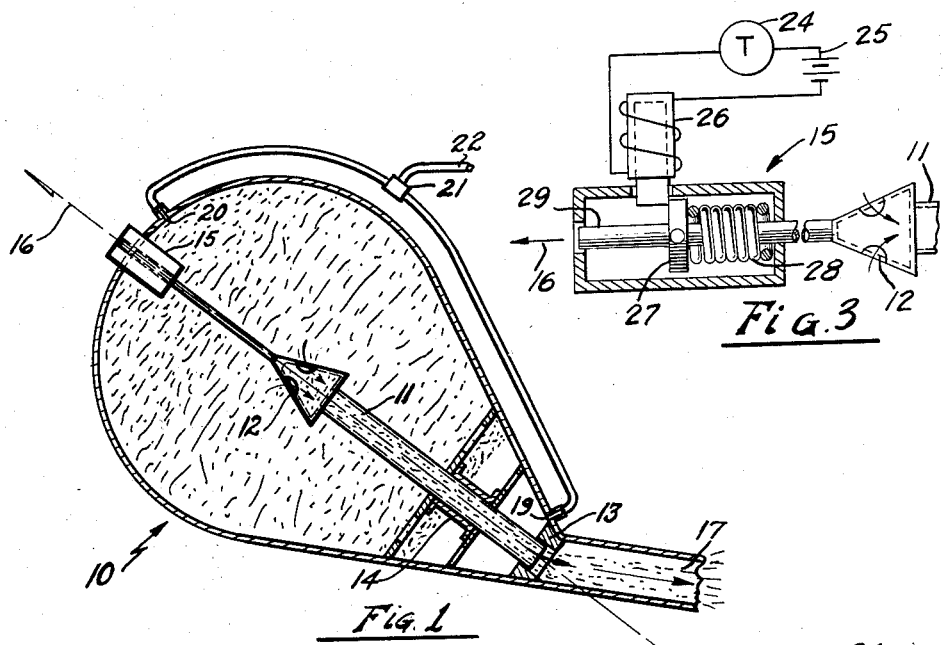
Fig. 1
Fig. 3
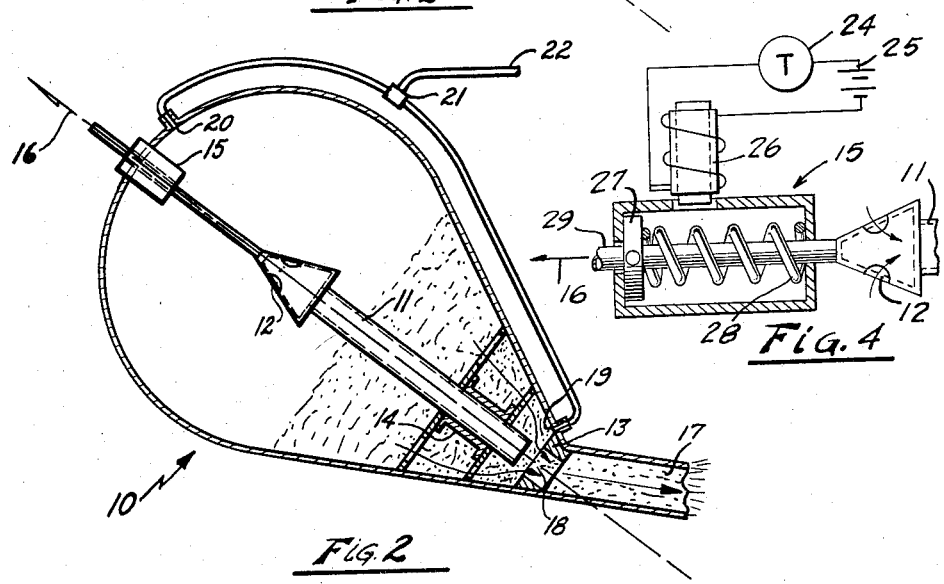
Fig. 2
Fig. 4
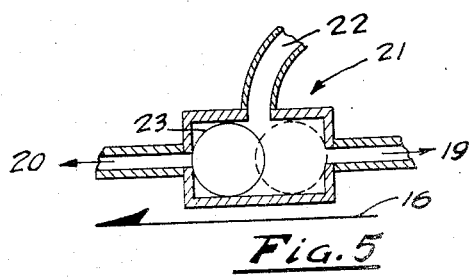
Fig. 5
INVENTOR.
HARRY S. MYERS JR.
BY Wade Koontz
Carl A. Christofferson
ATTORNEYS

United States Patent Office 2,884,937
Patented May 5, 1959

2,884,937

STANDPIPE PROPELLANT TANK

Harry S. Myers, Jr., West Covina, Calif., assignor to the United States of America as represented by the Secretary of the Air Force Application November 16, 1956, Serial No. 622,721

3 Claims. (Cl. 137—39)

This invention relates generally to a standpipe propellant tank which provides a full and continuous supply of liquid propellant to the engine of an aircraft, missile, or vehicle. More particularly, the invention provides improved means for assuring a substantially continuous flow of fuel from the storage tank to the engine of a rocket powered aircraft, missile, or vehicle, regardless of its attitude or thrust acceleration even after the level of fuel in the tank has dropped considerably and until the supply is substantially completely exhausted.

A necessary function of a fuel system in a motor driven aircraft is to provide the motor with a steady supply of fuel regardless of the position of the aircraft in relation to a given point of reference on the ground level. In the conventional propeller driven aircraft having an internal combustion reciprocating engine, the problem of keeping the flow of fuel constant may be solved by providing a fuel tank having a plurality of openings therein such that at least one of these openings would supply fuel to the motor regardless of the attitude of aircraft, thereby keeping the flow of fuel to the motor uninterrupted.

However, in a rocket driven aircraft the fuel storage tank is normally pressurized by an inert gas. Therefore, the provision of a plurality of direct outlet openings is not feasible as a method of keeping the fuel flow constant. The usual methods of fuel storage and supply in rocket aircraft are by rubber or plastic bladder-type fuel cell and by acceleration sensitive flexible outlets and compartment tanks.

Accordingly, it is the object of this invention to provide means wherein an uninterrupted flow of fuel is assured from the tank to the engine regardless of the attitude of the aircraft or amount of forward thrust acceleration.

Another object of the invention is to provide a substitute for the expulsion bladders or flexible outlets and tank compartments thereby providing a simpler and more trouble free structure as well as a reduction in weight which is so vital in aircraft design.

A further object of the invention is to provide a higher expulsion efficiency by reducing the amount of propellant wasted, such as that which is trapped in collector channels and propellant line to the engine in the case of bladder tanks and that remaining in each compartment in the case of compartment tanks.

A still further object of the invention is to provide a storage tank which is easier to service between fillings. As compared to the bladder tank, my invention requires only resetting the standpipe retracting and release mechanisms instead of the complex and involved series of steps required to recharge the bladder expulsion tank system.

A still further object of the invention is to lengthen the normal service life of a fuel tank system. In the bladder tank the service life is often shortened by the chemical action caused by the ordinarily long term contact of the bladder material with the propellant; whereas in my standpipe tank, materials may be used which are not affected by contact with or immersion in the propellant required as fuel for the (rocket) aircraft or missile.

Many fundamental advantages are gained by the use of this invention. Among these is the advantage of greater reliability and durability. As compared to the bladder tank, my invention is more reliable because of the mechanical features of its design which render it substantially less subject to damage during handling and installation. Also, the operation check-out of the mechanical features is simple whereas checking a bladder for damage or leakage during and after installation is a most difficult and tedious operation.

Another feature of my invention is the provision of a propellant fuel tank which drains more simply and completely than the more conventional compartmented tanks. This is so because the tank outlet connection on my invented tank system is at the low point and will allow complete drainage of the tank with the standpipe retracted; whereas in the compartmented tanks it is practically impossible to prevent the trapping of residual propellant in each of the compartments.

These and other objects, features, and advantages will become more apparent from the following description taken in connection with the illustrative embodiments in the accompanying drawings wherein:

Fig. 1 shows the standpipe in its initial position in the tank;

Fig. 2 shows the relative position of the standpipe after it has been retracted;

Fig. 3 shows a view of the standpipe retracting mechanism before retraction;

Fig. 4 shows the retraction mechanism after retraction; and

Fig. 5 shows an acceleration sensitive valve for directing the pressurizing gas to the proper pressure inlet.

Now referring to the figures, there is shown in Fig. 1 a view of a liquid propellant tank 10 which is gas pressurized and is intended to be used for boost-glide flight trajectories on rocket aircraft or missiles. This tank design is intended to provide uninterrupted liquid flow to the engine (not shown) regardless of the attitude of the aircraft or of the amount of forward thrust acceleration and is mounted in the aircraft so that the attitude of the tank with respect to its flight alignment is along the line 16.

When the tank 10 is appreciably greaer than half full, it will operate regardless of the attitude without uncovering either of the outlets 12 or 18 and interrupting the flow. However, since the acceleration produced by thrust largely determines the position of the liquid in the tank, provisions must be made so that the opening through which the liquid fuel is being discharged remains covered by said liquid fuel at all times, thereby assuring uninterrupted flow of fuel to the engine.

Initially the liquid fuel in the tank 10 is suspended from the upper part of the tank. This is the result of negative acceleration forces which act immediately on release of the rocket from the mother aircraft. The negative acceleration forces at the same time act upon the acceleration sensitive selector valve 21 in such a manner that the tank pressurizing gas entering through line 22 is directed to the aft pressure inlet 19 thereby pressurizing the tank with a minimum of bubbling of the gas through the liquid fuel.

After the tank 10 has been pressurized the fuel is expelled through openings 12 in the head of the standpipe 11 forcing the liquid out through the outlet 17 to the engine of the aircraft. In this initial position, the slip seal 13 around the standpipe prevents the liquid propellant from escaping from the tank into the outlet 17. The standpipe guide 14 holds the standpipe 11 in the desired position so that the release and retracting mechanism 15

(shown in Figs. 3 and 4) may operate to adjust said standpipe 11 to a position which would prevent the discharge opening of the tank 10 from becoming uncovered and thereby interrupting the flow of fuel to the engine.

In Fig. 2 the standpipe 11 is shown in retracted position where it rests during the latter part of the expulsion cycle. A secondary outlet 18 is provided in the smaller or aft end of the conical tank 10 to take advantage of the movement of the liquid fuel during positive acceleration after thrust is established. The establishment of the positive thrust acceleration also trips the acceleration sensitive valve 21 causing the ball member 23 to be forced backward so that the pressurizing gas inlet 19 is closed off and the inlet 20 is opened and becomes the source of pressurizing gas for the remainder of the expulsion cycle. The acceleration sensitive valve is shown in Fig. 5 including the ball member 23 also indicated in dotted lines to show its position after positive thrust has been established. By thus changing pressurizing gas inlets when the transition from negative to positive acceleration takes little or none of the pressurizing gas bubbles through the liquid fuel.

This outlet 18, which constitutes the tank opening after the standpipe 11 has been retracted by the retracting mechanism 15, remains covered by fuel even under the action of reversals of horizontal and vertical accelerations of limited magnitude because when subjected to forward acceleration (to the left) the liquid would tend to collect in the conical or aft portion of the tank 10. As a result, the liquid propellant fuel would normally flow past the slip seal 13 and through the opening 18 to the outlet 17 and thence to the rocket engine via the fuel line system.

The standpipe 11 moves through its guides 14 along the line 16 which is the line of symmetry and flight of the rocket aircraft itself. The standpipe retracting and release mechanism 15 is shown in detail in Figs. 3 and 4 and includes a source of current 25 which is controlled by the time delay relay 24. When the relay operates, the solenoid 26 is energized and the piston 27 is released allowing the spring 28 to force the piston forward. The forward movement of the piston, which is attached to the standpipe retracting shaft 29, draws the standpipe forward thereby effecting the transition from the center outlet to the aft outlet position.

The time delay acts to retract the standpipe 11 after the propulsion device has started and acceleration conditions have been established, but prior to the uncovering of the center outlet 12 that occurs after a certain portion of the fuel complement has been expelled.

Conventional pressurizing gas inlets 19 and 20 to the tank 10 are shown in the drawings. Said inlets 19 and 20 should be placed in positions to minimize bubbling of gas through the liquid propellant fuel with the consequent aeration of the liquid which would cause undesirable results in the operation of the rocket engine. It may be desirable to use two or more gas inlet positions with at least one for each of the outlet flow positions. In some applications, it is envisioned that an acceleration sensitive valve may be required to direct the gas to the inlet position which would provide the most efficient operating conditions of the system. For example, if a start is normally required under negative axial acceleration, the pressurizing gas should be initially directed into the aft portion of the tank so that the liquid is clear of the inlet 19 and the tank can be pressurized with a minimum of bubbling. After the engine starts and the position of the liquid shifts as a result of the forward acceleration thrust, the pressurizing gas may then be directed into the upper forward portion through inlet 20 of the tank which by this time has been cleared of liquid and is ready for normal operation with the secondary opening 18 discharging the fuel to the outlet 17. As shown in the drawings, the forward section of the tank is spherical while the aft section is conical.

While the tank described and shown is generally spherical in shape, it is believed obvious that the described principles could be applied equally well to tanks of other shapes, such as cylindrical or rectangular, by attaching a cone to the aft end of the differently shaped tanks.

Also it should be understood that although the invention has been described in its present preferred embodiment, it will be obvious to those skilled in the art, that various changes, alterations, modifications, and substitutions may be made without departing from the true spirit and scope of the appended claims.

Having thus described my invention, what I claim as new and desire to secure by Letters Patent of the United States is:

1. A liquid fuel supply system for a rocket-powered airborne vehicle comprising, a fuel storage tank having an outlet located in its rearmost section, means for pressurizing said tank by supplying gas at greater than atmospheric pressure to a pair of gas inlets in the wall of said tank, one of said gas inlets being located in the aft section of said tank, the other of said gas inlets being located in the forward section, an acceleration sensitive control valve for determining the inlet through which the pressurizing gas flows, said aft inlet operating during deceleration and said forward inlet operating during acceleration, a movable standpipe slidably mounted within said tank and normally preventing the flow of fuel through the tank outlet, the forward end of said standpipe being disposed in the central portion of said tank and provided with openings communicating with the discharge line from said tank, said forward openings operating during the initial period of tank expulsion cycle, and means for retracting said standpipe toward the forward end of said tank after a predetermined time interval, said retraction allowing the remaining fuel to flow directly through the tank outlet.

2. The liquid fuel system defined in claim 1 wherein the aft portion of the fuel storage tank is conically shaped to provide more complete expulsion of the fuel contained therein.

3. A liquid fuel system as defined in claim 1 wherein the pressurizing gas inlets of the fuel storage tanks are controlled to operate so that substantially none of the pressurizing gas passes through the fuel contained therein during the pressurization of said tank.

References Cited in the file of this patent

UNITED STATES PATENTS

| | | |
|---|---|---|
| 1,440,520 | Young | Jan. 2, 1923 |
| 1,488,289 | Ruff | Mar. 25, 1924 |
| 1,548,151 | MacGregor | Aug. 4, 1925 |
| 2,403,850 | Cowdrey et al. | July 9, 1946 |
| 2,599,235 | Coney | June 3, 1952 |